United States Patent
Yoshida et al.

(10) Patent No.: US 10,391,599 B2
(45) Date of Patent: Aug. 27, 2019

(54) ELECTRIC POWER TOOL (71) Applicant: HITACHI KOKI CO., LTD., Tokyo (JP)

(72) Inventors: Kenichirou Yoshida, Ibaraki (JP); Akira Onose, Ibaraki (JP); Shinji Kuragano, Ibaraki (JP); Takuya Konnai, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 668 days.

(21) Appl. No.: 14/328,230

(22) Filed: Jul. 10, 2014

(65) Prior Publication Data

US 2015/0034348 A1 Feb. 5, 2015

(30) Foreign Application Priority Data

Jul. 30, 2013 (JP) .................................. 2013-157728

(51) Int. Cl.
*B25F 5/00* (2006.01)
*B23Q 15/00* (2006.01)
*B23D 45/16* (2006.01)
*B23D 59/00* (2006.01)
*B27B 9/00* (2006.01)
*B23D 47/12* (2006.01)
*B24B 23/02* (2006.01)

(52) U.S. Cl.
CPC ............. *B23Q 15/00* (2013.01); *B23D 45/16* (2013.01); *B23D 47/12* (2013.01); *B23D 59/001* (2013.01); *B24B 23/028* (2013.01); *B25F 5/00* (2013.01); *B27B 9/00* (2013.01)

(58) Field of Classification Search
CPC .... B25F 5/00; B25F 5/001; B25F 5/02; H02P 6/002; H02P 6/28
USPC ......................................... 173/176, 178, 29
See application file for complete search history.

(56) References Cited

U.S. PATENT DOCUMENTS

| | | | | |
|---|---|---|---|---|
| 4,204,622 A | * | 5/1980 | Smith | ..................... B25C 1/003 173/1 |
| 4,628,459 A | | 12/1986 | Shinohara et al. | |
| 5,440,215 A | * | 8/1995 | Gilmore | ................ B23P 19/066 173/178 |
| 6,290,587 B1 | * | 9/2001 | McCracken | .......... A47L 11/164 451/294 |

(Continued)

FOREIGN PATENT DOCUMENTS

| | | |
|---|---|---|
| JP | S59-163608 A | 9/1984 |
| JP | 2005-144564 A | 6/2005 |

(Continued)

OTHER PUBLICATIONS

Japanese Office Action for the related Japanese Patent Application No. 2013-157728 dated Sep. 21, 2016.

*Primary Examiner* — Andrew M Tecco
*Assistant Examiner* — Praachi M Pathak
(74) *Attorney, Agent, or Firm* — Kenealy Vaidya LLP (57) ABSTRACT

There is provided an electric power tool having a plurality of operation modes with different rotation speeds at least in a predetermined load range. The electric power tool is capable of switching between the operation modes when a predetermined condition is satisfied even during a motor is driven, and configured such that a rotation speed of the motor is changed smoothly or in a stepwise manner at the switching between the operation modes.

20 Claims, 8 Drawing Sheets

(56) References Cited

U.S. PATENT DOCUMENTS

| | | | | |
|---|---|---|---|---|
| 7,419,013 | B2* | 9/2008 | Sainomoto | B25B 23/1405 173/104 |
| 2005/0121209 | A1* | 6/2005 | Shimizu | B25F 5/02 173/217 |
| 2010/0212923 | A1* | 8/2010 | Zimmermann | B23B 45/008 173/47 |
| 2013/0165026 | A1* | 6/2013 | Sugita | B24B 23/02 451/357 |
| 2013/0240230 | A1* | 9/2013 | Saur | B25B 21/00 173/178 |
| 2015/0151447 | A1* | 6/2015 | Petersson | B25F 5/006 30/381 |
| 2016/0193673 | A1* | 7/2016 | Yoshida | B23D 47/12 30/388 |

FOREIGN PATENT DOCUMENTS

| | | | | |
|---|---|---|---|---|
| JP | 2012-139752 A | 7/2012 | | |
| JP | WO 2012108415 A1 * | 8/2012 | | B25F 5/00 |
| JP | 2012-179698 A | 9/2012 | | |

* cited by examiner

ELECTRIC POWER TOOL

CROSS-REFERENCE TO RELATED APPLICATION

This application claims priority from Japanese Patent Application No. 2013-157728, filed on Jul. 30, 2013, the entire subject matter of which is incorporated herein by reference.

BACKGROUND OF THE INVENTION

1. Field of the Invention

The present invention relates to an electric power tool having a plurality of operation modes with different rotation speeds at least in a predetermined load range.

2. Description of the Related Art

A related-art electric power tool having a mode switching function is configured such that when a mode change switch is pushed, the operation mode of the electric power tool is switched; however, while a main trigger switch is being pulled, even when the mode change switch is pushed, the operation mode is not switched.

According to the above-described configuration, for example, in a case of a circular saw, when a user wants to switch the operation mode in the middle of cutting, the user needs to first turn off a main trigger switch, and take a circular saw blade off a workpiece, and push a mode change switch, thereby switching the operation mode, and re-perform cutting from a midpoint. Therefore, there are problems that more effort is required to switch the operation mode and work efficiency is not excellent.

SUMMARY OF THE INVENTION

The present invention has been made in view of the above circumstances, and an object of the present invention is to provide an electric power tool capable of reducing effort for switching the operation mode and improving work efficiency.

According to an aspect of the present invention, there is provided an electric power tool having a plurality of operation modes with different rotation speeds at least in a predetermined load range, the electric power tool being capable of switching between the operation modes when a predetermined condition is satisfied even during a motor is driven, and configured such that a rotation speed of the motor is changed smoothly or in a stepwise manner at the switching between the operation modes.

In the above electric power tool, when a load is equal to or larger than a predetermined value, the switching may not be performed.

In the above electric power tool, the operation modes may include: a normal mode in which a duty ratio of a switching device for controlling supply of electric power to the motor is set to 100%; and an economy mode in which the duty ratio is controlled such that the rotation speed of the motor is maintained at a predetermined rotation speed.

The above electric power tool may comprise: a main switch configured to perform switching between driving and stopping of the motor; and a mode change switch configured to perform switching between the operation modes, wherein the main switch and the mode change switch may be disposed to be operable with a hand holding a handle portion.

The above electric power tool may comprise: a battery pack configured to be removably attached for supplying electric power to the motor; a main switch; a mode change switch; and a control unit configured to control driving of the motor according to an operation state of the main switch and the mode change switch, wherein when the main switch is maintained in an OFF state for a predetermined time period, the control unit may be turned off, and when the main switch is turned on, the control unit may return from the OFF state to an ON state.

The above electric power tool may comprise: a mode change switch; and a display unit configured to display a present operation mode, wherein the mode change switch and the display unit may be disposed on a same circuit board.

In the above electric power tool, the circuit board may be provided on a lower side of a handle portion.

According to another aspect of the present invention, there is provided an electric power tool comprising: a brushless motor; a rotary tool configured to be rotated by the brushless motor; a switching device configured to control supply of electric power to the brushless motor; a control unit configured to control the switching device; a handle portion including a main switch; and a mode change switch capable of switching a rotation speed set for use during no-load, wherein even when the main switch is being operated, the control unit is capable of performing switching between operation modes based on an operation on the mode change switch.

In the above electric power tool, the operation modes may include: a normal mode in which a duty ratio of a switching device for controlling supply of electric power to the motor is set to 100%; and an economy mode in which the duty ratio is controlled such that the rotation speed of the motor is maintained at a predetermined rotation speed.

In the above electric power tool, in any of the operation modes, during activating of the brushless motor and during switching between the operation modes, the control unit may be configured to gradually change supply of electric power to the brushless motor.

Arbitrary combinations of the above described components, and modifications obtained by conversion of the present invention between methods and systems are also available within the present invention.

According to the above configuration, it is possible to provide an electric power tool capable of reducing effort for switching the operation mode and improving work efficiency.

DETAILED DESCRIPTION

Hereinafter, embodiments of the present invention will be described with reference to the accompanying drawings. Components, members, and the like shown in the drawings and identical or equivalent to each other are denoted by the same reference symbol and may not be repeatedly described. The embodiments do not limit the invention and are illustrative, and all features to be described in the embodiments, and combinations thereof may not be the essential features of the invention.

Figure 3:
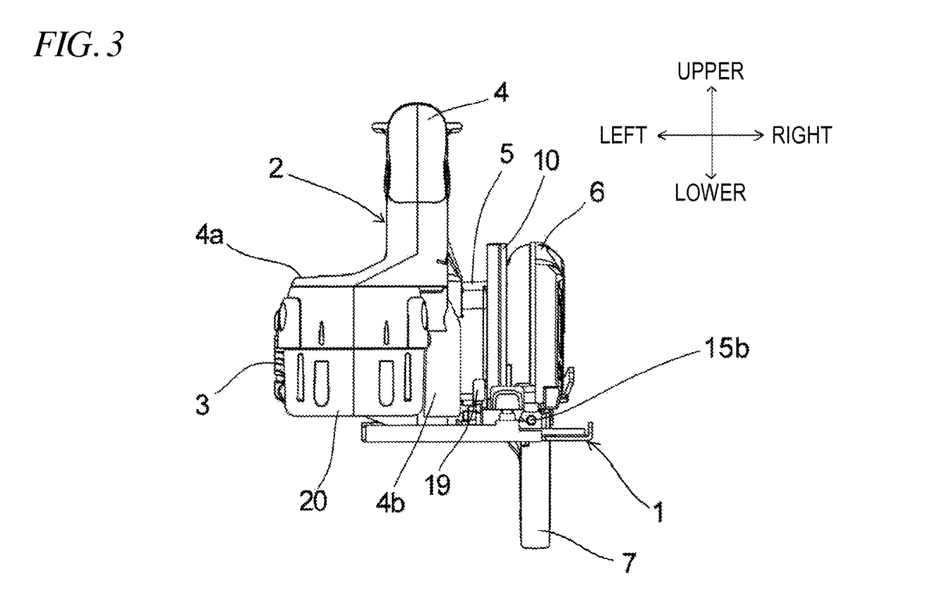
FIG. 3 is a rear view of the cordless circular saw.
Figure 4:
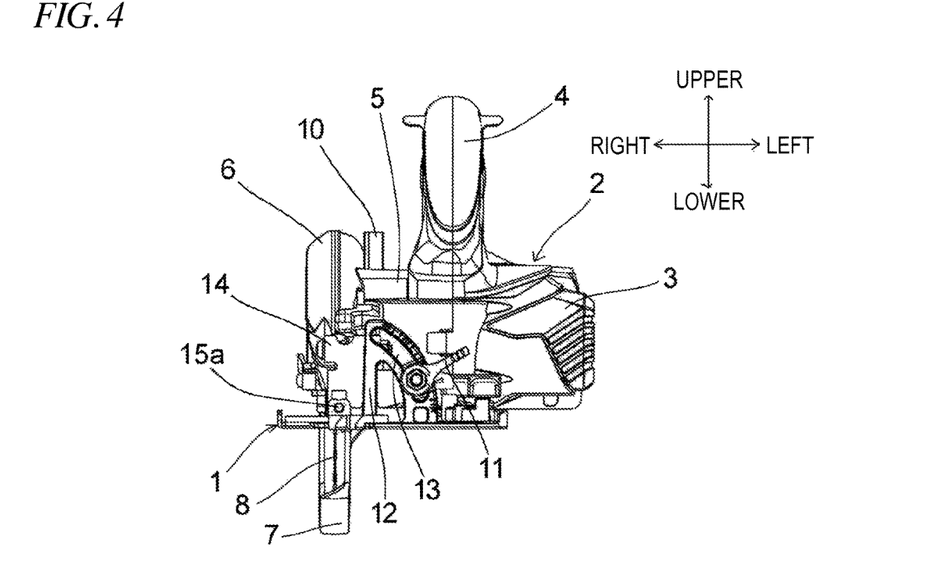
FIG. 4 is a front view of the cordless circular saw.
Figure 5:
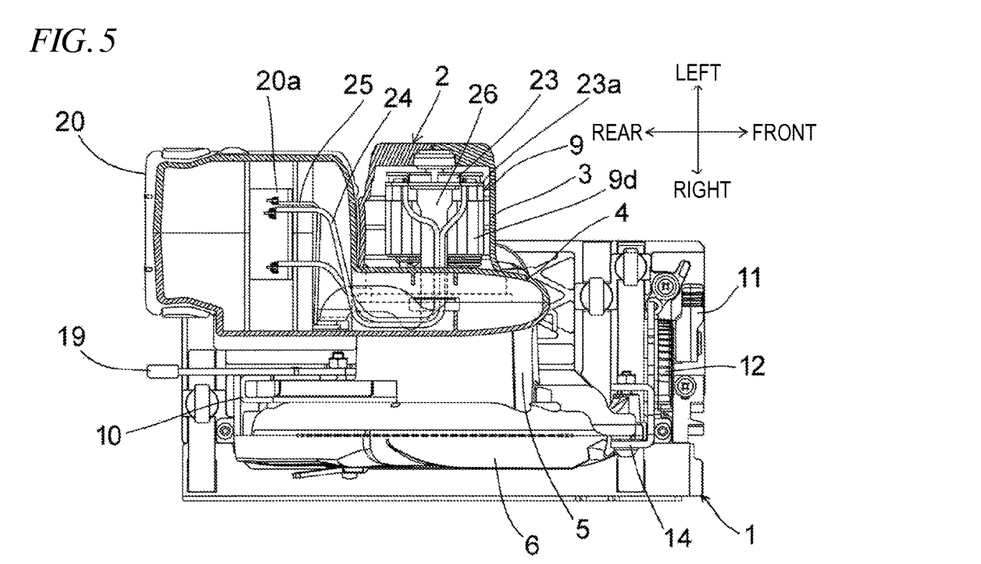
FIG. 5 is a first plan view of the cordless circular saw where a portion thereof is shown as a cross-section.
Figure 6:
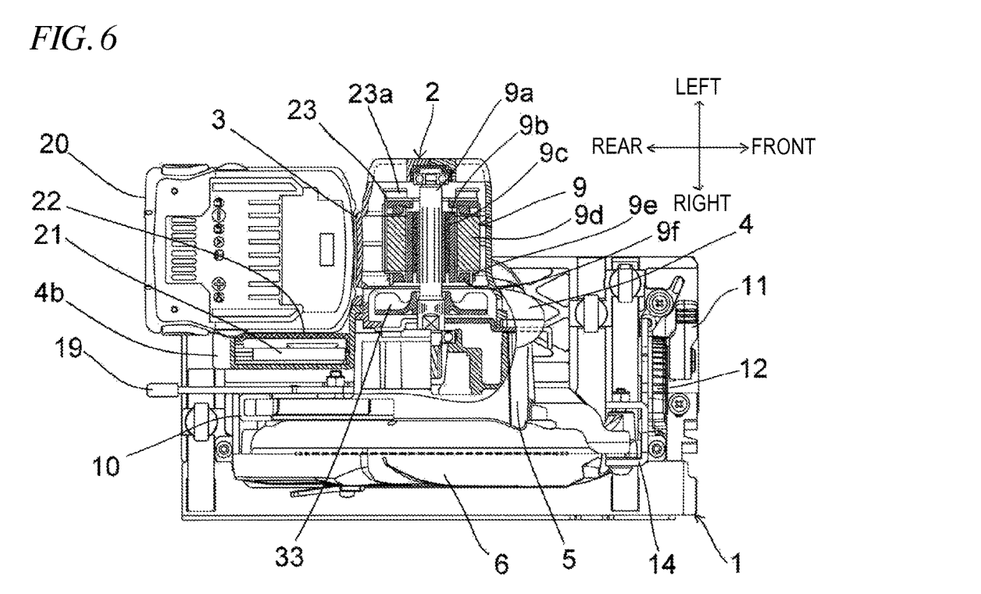
FIG. 6 is a second plan view of the cordless circular saw where another portion is shown as a cross-section.
Figure 7:
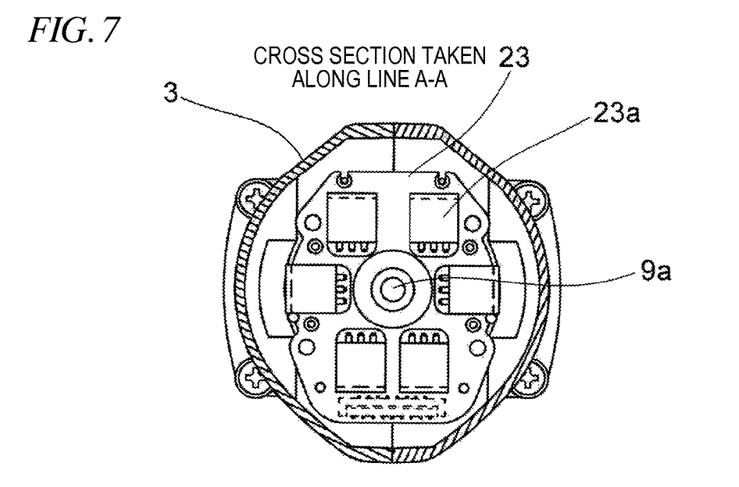
FIG. 7 is a cross-sectional view taken along a line A-A of FIG. 1.

FIGS. 1 to 4 are a plan view, a side view, a rear view, and a front view showing a cordless circular saw according to an embodiment of the present invention, respectively. FIG. 5 is a first plan view of the cordless circular saw where a portion thereof is shown as a cross-section. FIG. 6 is a second plan view of the cordless circular saw where another portion thereof is shown as a cross-section. FIG. 7 is a cross-sectional view taken along a line A-A of FIG. 1.

The cordless circular saw of the present embodiment includes a base 1 and a main body 2. The base 1 is a plate material made of a metal such as aluminum substantially in a rectangular shape. The longitudinal direction of the base 1 coincides with a cutting direction. The bottom of the base member 101 is a surface to slide on a workpiece. The main body 2 is joined with the base 1 at two positions in a front-rear direction such that the main body can rotate and tilt leftward or rightward with respect to the base 1. The main body 2 includes a motor housing 3, a handle portion 4, a gear cover 5, a saw cover 6, a protective cover 7, and a circular saw blade 8 (a rotary tool). The motor housing 3 is made of, for example, a resin, and accommodates a brushless motor 9 (FIGS. 5 and 6). The brushless motor 9 rotates the circular saw blade 8. The handle portion 4 is made of the same material as that of the motor housing 3, and extends in the front-rear direction on the motor housing 3. The handle portion 4 includes a main trigger switch 18 (a main switch) as an operation unit for allowing a user to perform switching between driving and stopping of the brushless motor 9. As shown in FIGS. 3 and 4, the handle portion 4 is configured by a left component provided integrally with the motor housing 3, and a right component interposed between the motor housing 3 and the gear cover 5, and the left component and the right component are combined to configure a battery pack attaching portion 4a (to be described below), and a control circuit board accommodating portion 4b (to be described below) is provided at the right component of the handle portion 4 positioned on a side of the circular saw blade 8. The boundary between the left component and the right component of the handle portion 4 is a line shown at the center of the handle portion 4 in FIG. 1, FIG. 3, FIG. 4, and so on.

Figure 1:
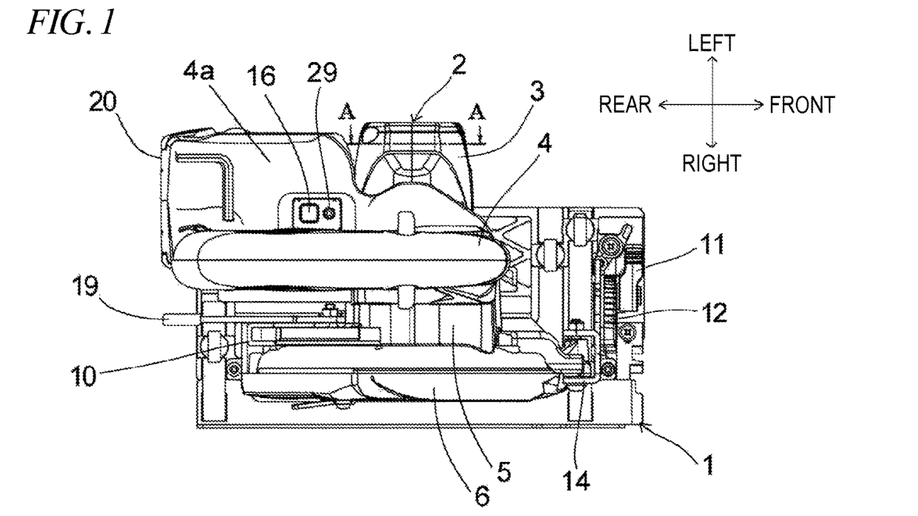
FIG. 1 is a plan view showing a cordless circular saw according to an embodiment of the present invention.
Figure 2:
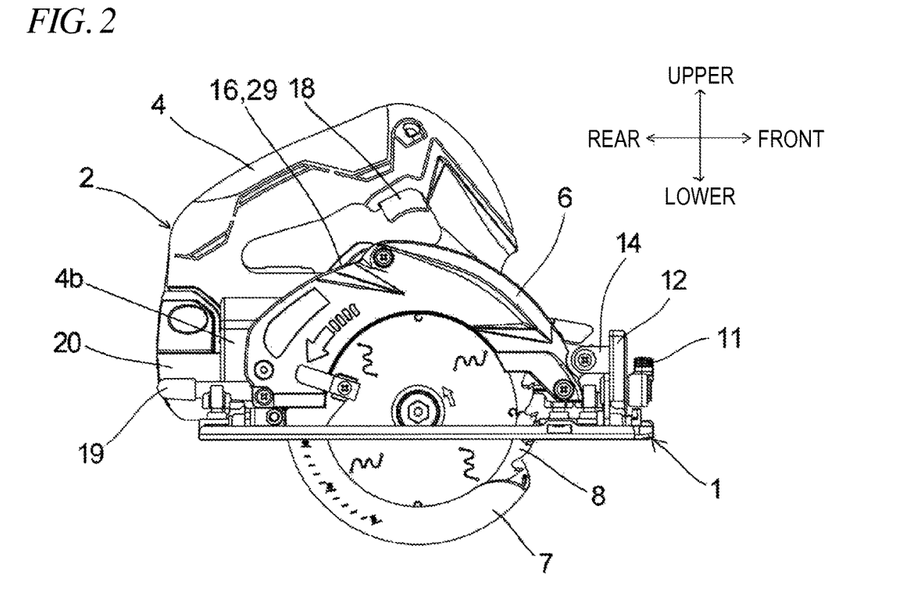
FIG. 2 is a side view of the cordless circular saw.

At the lower portion of the rear end of the handle portion 4, the battery pack attaching portion 4a (a battery attaching portion) and the control circuit board accommodating portion 4b are integrally provided. A battery pack 20 (a rechargeable battery) is slid into the battery pack attaching portion 4a from the rear side, thereby being removably attached. On the upper surface of the battery pack attaching portion 4a on the lower side of the handle portion 4, a mode change switch 16 (for example, a tact switch) and an LED 29 to serve as a display unit for displaying a mode are provided. The user can select, for example, any one of a normal mode and an economy mode by the mode change switch 16. The mode change switch 16 and the LED 29 are provided on the same board, and when the economy mode is set by operating the mode change switch 16, the LED 29 is turned on. Since the mode change switch 16 is provided on the lower side of the handle portion 4, mode switching is prevented from being unexpectedly performed due to a cause such as a collision of the mode change switch 16 with something. The battery pack 20 supplies driving power to the brushless motor 9. As shown in FIG. 1, the left surface of the battery pack 20 attached to the battery pack attaching portion 4a, and the left surface of the motor housing 3 exist substantially on the same plane. That is, the distance of the left surface of the motor housing 3 from the circular saw blade 8, and the distance of the left surface of the battery pack 20 from the circular saw blade 8 are substantially the same. Therefore, it is possible to place the cordless circular saw with the left surface of the battery pack 20 and the left surface of the motor housing 3 downward, and to easily perform work for exchanging the circular saw blade 8. The control circuit board accommodating portion 4b is provided on the right side of the battery pack 20. In the control circuit board accommodating portion 4b, a control circuit board 21 is stored and held. The control circuit board 21 has a control unit (a controller) mounted thereon for controlling the operation of the brushless motor 9. The control circuit board 21 is substantially perpendicular to the rotation axis of the brushless motor 9 (the rotation axis of the circular saw blade 8). The control circuit board 21, more specifically, the left side of the control circuit board 21 is partitioned off from the battery pack 20 by a controller cover 22 made of, for example, a resin.

The gear cover 5 is provided on the right side of the handle portion 4. The gear cover 5 is made of, for example, a metal, and accommodates a mechanism for transmitting rotation between the brushless motor 9 and the circular saw blade 8. The rotation transmitting mechanism is configured by a known deceleration mechanism. The saw cover 6 is attached to the gear cover 5, and covers the upper half of the circular saw blade 8 in conjunction with the gear cover 5. The saw cover 6 may be formed of the same material as that of the gear cover 5, integrally with the gear cover 5. The front end portions of the gear cover 5 and the saw cover 6 are rotatably joined by a rotation supporting unit 14. The protective cover 7 is made of, for example, a resin, and is rotatably provided along the outer edges of the gear cover 5 and the saw cover 6 on the rear side of the gear cover 5. Between the gear cover 5 and the protective cover 7, a spring (not shown) is interposed. This spring biases the protective cover 7 against the gear cover 5, in a direction (a counter-clockwise direction in FIG. 2) for covering the lower half of the circular saw blade 8 in the circumferential direction of the gear cover 5 and the saw cover 6. Therefore, in a state where cutting work is not being performed, the protective cover 7 covers the lower half of the circular saw blade 8 (a portion protruding from the bottom of the base 1), except for a portion of the front side.

On the front side of the base 1, a bevel plate 12 is provided to stand. The bevel plate 12 stands in a short-length direction substantially perpendicular to a cutting direction. The bevel plate 12 has a long hole 13. The long hole 13 has an arc shape having a first tilt shaft portion 15a extending in the cutting direction, as the center, and perpendicular to the first tilt shaft portion 15a. The rotation supporting unit 14 is supported to be able to tilt on the first tilt shaft portion 15a to left or right with respect to the base 1. The tilt position of the rotation supporting unit 14 is adjusted in a state where a tilt-angle adjusting lever 11 is loose, and is fixed by fastening the tilt-angle adjusting lever 11. The rotation supporting unit 14 rotatably supports the front end portion of the saw cover 6 on an axis parallel to the rotation axis of the brushless motor 9 (the rotation axis of the circular saw blade 8). Adjusting and fixing of the rotational position of the saw cover 6 will be described below.

On the rear side of the base 1, a link 10 is provided along the left surface of the gear cover 5 so as to be rotatable around a tilt shaft portion 15b concentric with the first tilt shaft portion 15a. The link 10 is made of a metal such as aluminum. In a state where a cutting-depth adjusting lever 19 is loose, the link 10 and the gear cover 5 are slidable with respect to each other, and thus it is possible to adjust the rotational position of the saw cover 6 with respect to the base 1, that is, the cutting depth. Further, it is possible to fix the rotational position of the gear cover 5 by fastening the cutting-depth adjusting lever 19.

As shown in FIG. 6, the brushless motor 9 has a rotor core 9b around an output shaft 9a. The output shaft 9a is parallel to the rotation axis of the circular saw blade 8. The rotor core 9b rotates integrally with the output shaft 9a. A rotor magnet 9c is inserted into and supported in the rotor core 9b. A stator core 9d is provided to surround the outer circumferential surface of the rotor core 9b. On the stator core 9d, a stator coil 9f is provided with an insulator 9e interposed therebetween. On the left end side of the stator core 9d, a switching board 23 is fixed. The switching board 23 is substantially perpendicular to the output shaft 9a. As shown in FIG. 7, on the switching board 23, six switching devices 23a (such as FETs) are mounted such that their main body portions are laid down. The switching devices 23a switch a supply voltage from the battery pack 20. As shown in FIG. 5, a terminal portion 20a of the battery pack 20, and the switching board 23 are electrically connected to each other by a wiring line 24. A wiring line 25 electrically connects the terminal portion 20a of the battery pack 20 and the control circuit board 21 to each other. A wiring line 26 electrically connects the control circuit board 21 and the switching board 23 to each other. A control signal from the controller of the control circuit board 21 is applied to control terminals (gates) of the switching devices 23a mounted on the switching board 23, by the wiring line 26, whereby ON/OFF of the switching devices 23a is controlled. A cooling fan 33 is attached to the output shaft 9a of the brushless motor 9, and rotates with the output shaft 9a. The cooling fan 33 generates an air flow which cools the brushless motor 9 and the switching devices 23a.

Figure 8:
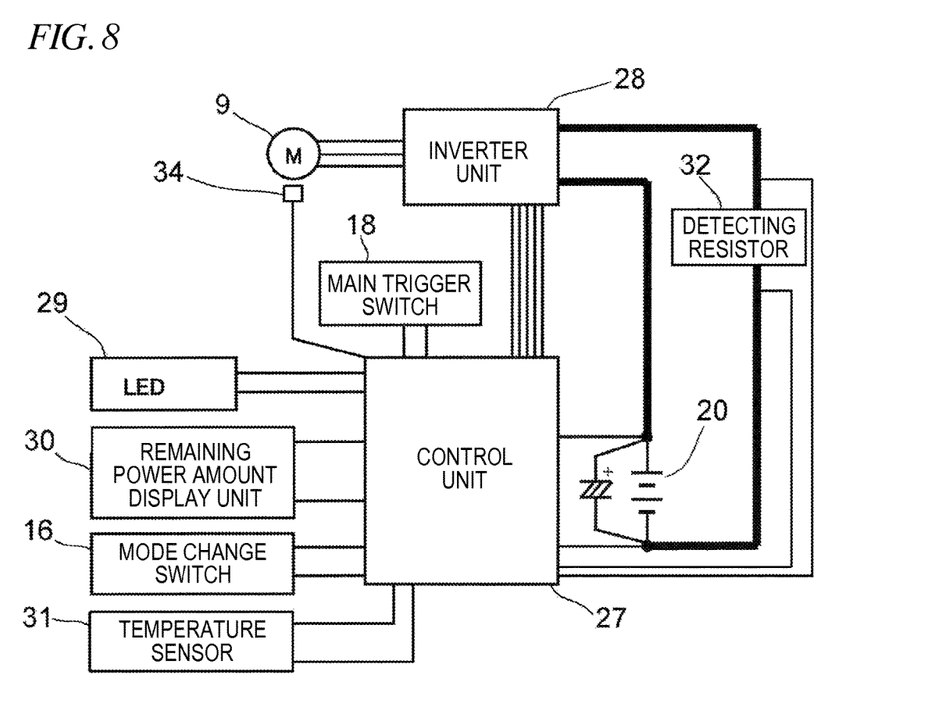
FIG. 8 is a view showing the functional blocks of the cordless circular saw shown in FIG. 1.

FIG. 8 is a view showing the functional blocks of the cordless circular saw according to the embodiment of the present invention. A control unit 27 is mounted on the control circuit board 21 shown in FIG. 6. An inverter unit 28 is a circuit obtained by connecting the switching devices 23a shown in FIGS. 6 and 7 in a bridge form. A remaining power amount display unit 30 displays the remaining power amount of the battery pack 20. A temperature sensor 31 includes a temperature detecting device such as a thermistor provided in the vicinity of the switching devices 23a of the inverter unit 28, and detects the temperature of the switching devices 23a. A detecting resistor 32 is provided on the path of a drive current for the brushless motor 9. The control unit 27 can detect the drive current by the terminal voltage of the detecting resistor 32. A rotation sensor 34 is, for example, a magnetic sensor such as three Hall devices. The control unit 27 detects the rotation speed of the brushless motor 9 by an output signal of the rotation sensor 34. When the main trigger switch 18 is turned on, the control unit 27 applies a PWM signal to each switching device 23a of the inverter unit 28 according to a mode (for example, any one of the normal mode and the economy mode) set by the mode change switch 16, thereby controlling driving of the brushless motor 9. In the normal mode, the control unit 27 controls the duty ratio of the PWM signal to be applied to each switching device 23a such that the duty ratio becomes 100%, and in the economy mode, the control unit 27 controls the duty ratio such that the circular saw blade 8 rotates at a predetermined rotation speed (for example, 3,000 rpm). In a case of driving the brushless motor 9, in every mode, the control unit 27 performs soft start control for gradually increasing the duty ratio such that in the normal mode, the duty ratio becomes 100% when about 0.6 seconds elapses, and in the economy mode, in an no-load state, the circular saw blade 8 rotates at the predetermined rotation speed when about 0.4 seconds elapses.

Figure 9:
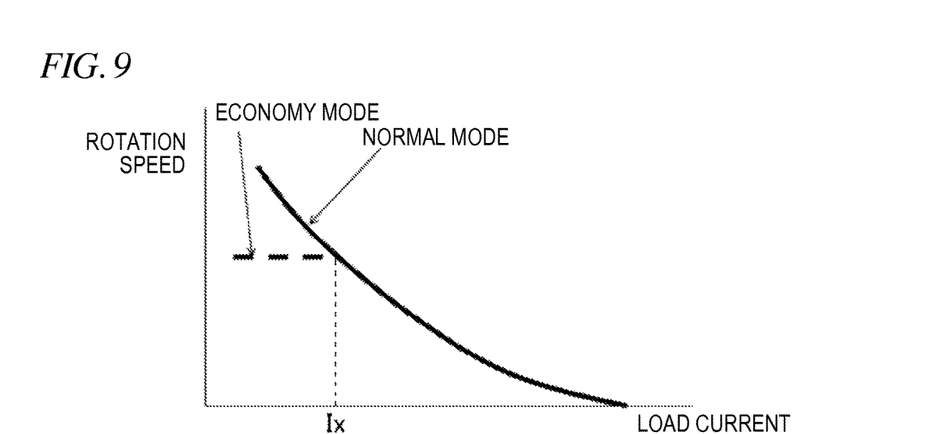
FIG. 9 is a characteristic diagram showing the relation between rotation speed and load current when the cordless circular saw is in a normal mode and in an economy mode.

FIG. 9 is a characteristic diagram showing the relation between the rotation speed and the load current when the cordless circular saw of the embodiment is in the normal mode and in the economy mode. In the normal mode, as the load current increases from a no-load state, the rotation speed decreases. The economy mode is different from the normal mode in that in a case where the load current is equal to or less than Ix, control (constant-speed control) is performed such that the rotation speed becomes constant, while the economy mode is the same as the normal mode in control in a case where the load current exceeds Ix. In the economy mode, as the load increases, the duty ratio increases up to 100%. Therefore, in a case where a load exceeding a predetermined value at which the duty ratio becomes 100% is applied, even in the economy mode, the same control as that in the normal mode is performed. Incidentally, there may be a plurality of economy modes.

Figure 10:
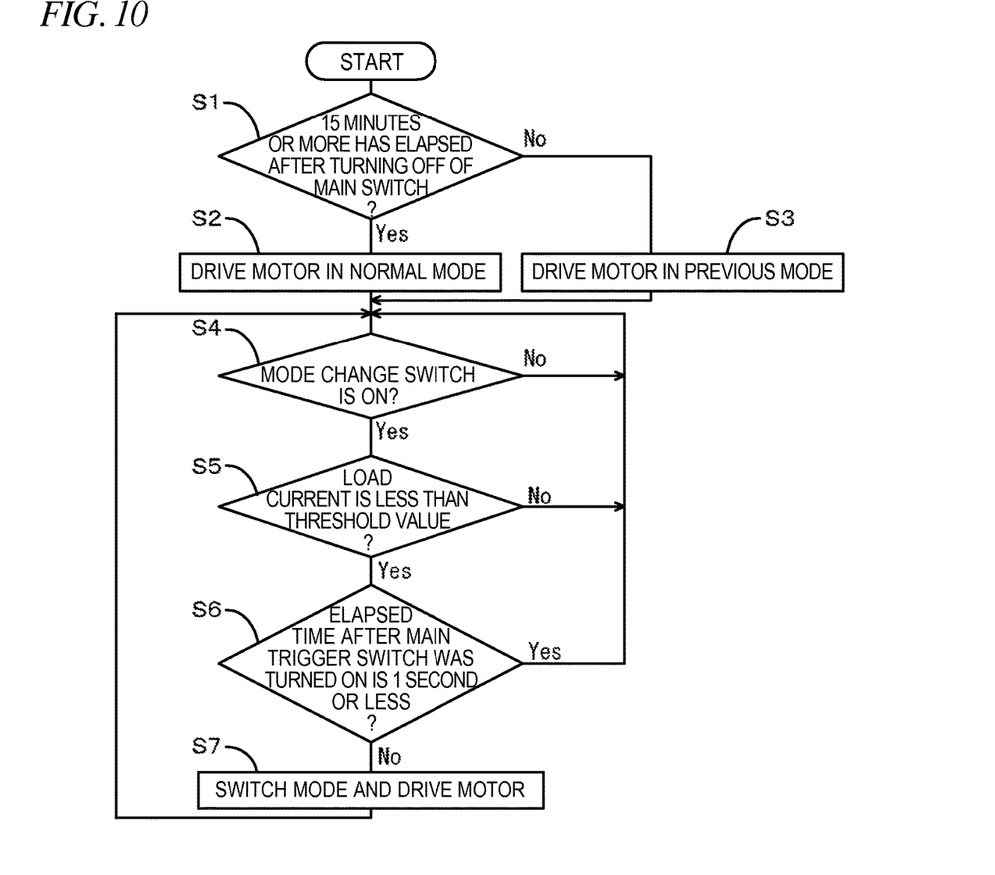
FIG. 10 is a flow chart showing control of a control unit shown in FIG. 8.

FIG. 10 is a flow chart showing control of the control unit 27 shown in FIG. 8. When the user turns on the main trigger switch 18, the control shown in the flow chart starts. In Step S1, the control unit 27 determines whether the difference between the timing when the main trigger switch 18 is turned on and the latest timing when the main trigger switch 18 was turned off is a predetermined time period (for example, 15 minutes) or more. When the difference is the predetermined time period or more ("YES" in Step S1), in Step S2, the control unit 27 drives the brushless motor 9 in the normal mode. Meanwhile, when the difference is less than the predetermined time period ("NO" in Step S1), in Step S3, the control unit 27 drives the brushless motor 9 in the previous operation mode (the latest operation mode). Thereafter, when the mode change switch 16 is pushed during driving of the brushless motor 9 ("YES" in Step S4), the control unit 27 determines whether the load current is less than a threshold value, in Step S5, and determines whether the elapsed time after the main trigger switch 18 was turned on is 1 second or less, in Step S6. When the load current is less than the threshold value ("YES" in Step S5), and the elapsed time after the main trigger switch 18 was turned on is longer than 1 second ("NO" in Step S6), in Step S7, the control unit 27 switches the operation mode and drives the brushless motor 9. The threshold value of the load current is, for example, Ix shown in FIG. 9. In a case where the load current is not less than the threshold value ("NO" in Step S5), or in a case where the elapsed time after the main trigger switch 18 was turned on is 1 second or less ("YES" in Step S6), the control unit 27 keeps on driving the brushless motor 9, without performing switching of the operation mode.

That is, when the main trigger switch 18 is maintained in the OFF state for 15 minutes, the control unit 27 is turned off, and when the main trigger switch 18 is turned on, the control unit 27 returns from the OFF state to the ON state. Therefore, it is possible to suppress consumption of the battery pack 20 which is driving power. When the control unit 27 is in the ON state, the control unit 27 keeps on storing a set mode, and in the economy mode, the control unit 27 maintains the above described LED 29 in the ON state, and in the normal mode, the control unit 27 maintains the LED 29 in the OFF state. Incidentally, in the above configuration, when the control unit 27 is turned on, the motor is set to be activated in the normal mode. However, when the control unit is off, the motor is set to be activated in the economy mode, as a default, such that consumption of the battery pack 20 is suppressed.

In order to prevent mode switching from being performed during soft start in which the rotation speed of the circular saw blade 8 is not stable, in Step S6, mode switching is prohibited for 1 second after the main trigger switch 18 is turned on. However, in order to suppress mode switching while a load is being applied, mode switching may be allowed within 10 seconds before and after activating of the brushless motor 9. In a case where mode switching is prohibited when a load is large, as described above, it is possible to prevent some problems, such as a problem that mode switching is not normally performed, due to noise when a high current flows.

Figure 11:
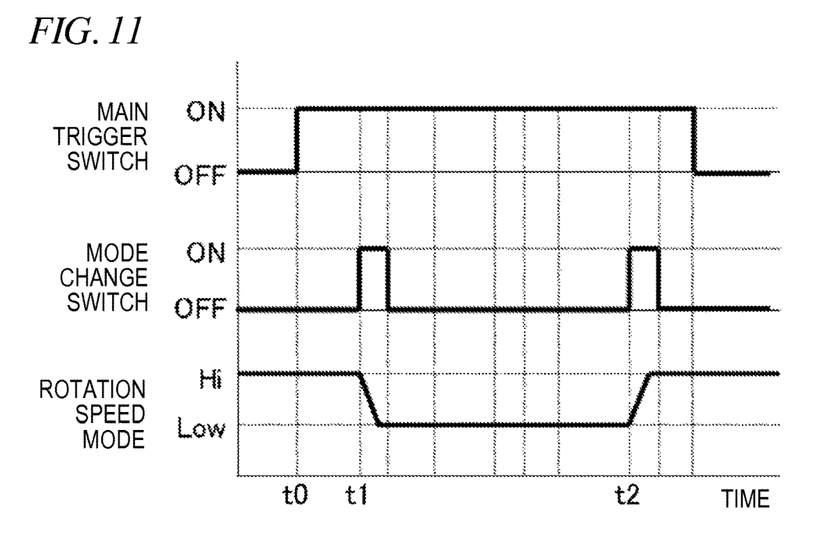
FIG. 11 is a first time chart showing an operation of the cordless circular saw.

FIG. 11 is a first time chart showing the operation of the cordless circular saw. At a time to, when a user turns on the main trigger switch 18, the control unit 27 drives the brushless motor 9 in the normal mode, and at a time t1, when the user pushes the mode change switch 16, the control unit 27 switches the operation mode from the normal mode to the economy mode. At this switching, the duty ratio of the PWM signal to be applied to each switching device 23a is gradually reduced, such that the rotation speed of the brushless motor 9 is smoothly changed, whereby recoil is reduced. Thereafter, at a time t2, when the user pushes the mode change switch 16 again, the control unit 27 switches the operation mode from the economy mode to the normal mode. At this time also, the duty ratio of the PWM signal to be applied to each switching device 23a is gradually increased, such that the rotation speed of the brushless motor 9 is changed smoothly or in a stepwise manner, whereby recoil is reduced. When the operation mode is switched from the economy mode to the normal mode, the control unit 27 gradually increases the duty ratio up to 100%. Meanwhile, when the operation mode is switched from the normal mode to the economy mode, while monitoring the rotation speed of the brushless motor 9, the control unit gradually reduces the duty ratio from 100% until the rotation speed of the circular saw blade 8 reaches a predetermined rotation speed. Thereafter, the control unit 27 performs feedback control so as to maintain the rotation speed of the circular saw blade 8 at the predetermined rotation speed.

Figure 12:
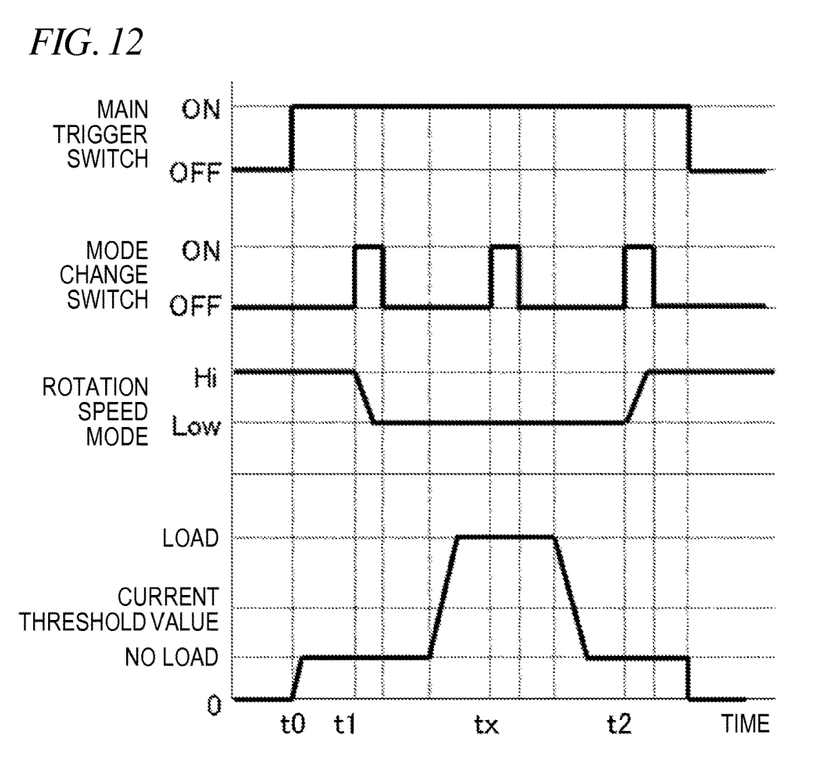
FIG. 12 is a second time chart showing the operation of the cordless circular saw.

FIG. 12 is a second time chart showing the operation of the cordless circular saw. In a case where the user turns on the main trigger switch 18 at a time t0 and pushes the mode change switch 16 at a time t1 and a time t2, the load current becomes less than the threshold value (here, a no-load operation). Therefore, the control unit performs switching of the operation mode like in the times t1 and t2 of the time chart of FIG. 11. Meanwhile, in a case where the user pushes the mode change switch 16 at a time tx, the load current becomes equal to or higher than the threshold value. Therefore, the control unit keeps on driving the brushless motor 9 without performing switching of the operation mode.

According to the above-described embodiment, the following effects can be achieved.

(1) Even while the main trigger switch 18 is being pulled, when a predetermined condition is satisfied, switching of the operation mode can be performed. Therefore, as compared to the related-art configuration, it is possible to reduce effort for switching the operation mode, thereby improving work efficiency.

(2) In a related art, in order to switch the operation mode, it is required to perform: turning off the main trigger switch 18 and taking the circular saw blade 8 off a workpiece, and pushing the mode change switch 16, thereby switching the operation mode. Then, when cutting is re-performed from a midpoint, the cutting plane is likely to be uneven, and the machining quality is apt to be deteriorated. However, according to the above-described configuration, since switching of the operation mode can be performed without interrupting machining, machining quality can be improved.

(3) In a case of switching the operation mode during rotation of the brushless motor 9, when the rotation speed suddenly changes, recoil becomes too large to easily use the cordless circular saw. However, in the present embodiment, since the rotation speed changes smoothly or in a stepwise manner at switching of the operation mode, recoil becomes less and thus it is easy to use the cordless circular saw.

(4) When a load current is high, switching of the operation mode may not be normally performed due to influence of noise. However, in the present embodiment, when a load is equal to or larger than a threshold value (a predetermined value), switching of the operation mode is not accepted. Therefore, the cordless circular saw is resistant to influence of noise. Also, according to the present embodiment, even in the economy mode, when a load is large, the same control as that in the normal mode is performed. Therefore, it is unnecessary to frequently perform mode switching during working, and thus the cordless circular saw is excellent in workability.

(5) When the main trigger switch 18 is maintained in the OFF state for the predetermined time, the control unit 27 is turned off, and when the main trigger switch 18 is turned on, the control unit 27 returns from the OFF state to the ON state. In an electric power tool having this configuration, consumption of drive current can be suppressed, and the mode switching can be performed while operating the main trigger switch 18. Therefore, the electric power tool is excellent in operability.

Although the invention has been described by reference to the embodiment, it can be understood by those skilled in the art that a variety of modifications can be applied to the components and processes of the embodiment without departing from the scope of the claims. Hereinafter, other embodiments will be described.

Figure 13:
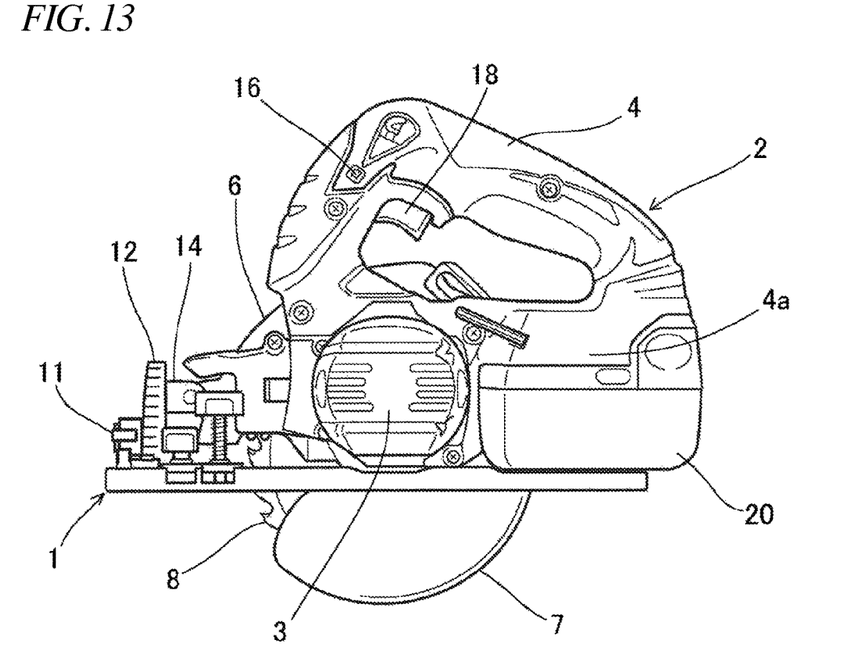
FIG. 13 is a side view showing a cordless circular saw according to another embodiment of the present invention, wherein a mode change switch 16 is provided in the vicinity of a main trigger switch 18 of a handle portion 4.

FIG. 13 is a side view showing a cordless circular saw according to another embodiment, wherein a mode change switch 16 is provided in the vicinity of a main trigger switch 18 of a handle portion 4. According to the configuration of FIG. 13, it is possible to operate both of the main trigger switch 18 and the mode change switch 16 with a hand holding the handle portion 4. Specifically, in a case of holding the handle portion 4 with a right hand, it is possible to operate the mode change switch 16 with the thumb of the right hand, while in a case of holding the handle portion 4 with a left hand, it is possible to operate the mode change switch 16 with the index finger or middle finger of the left hand. Therefore, it is possible to easily perform mode switching in the middle of working, and operability is excellent.

Figure 14:
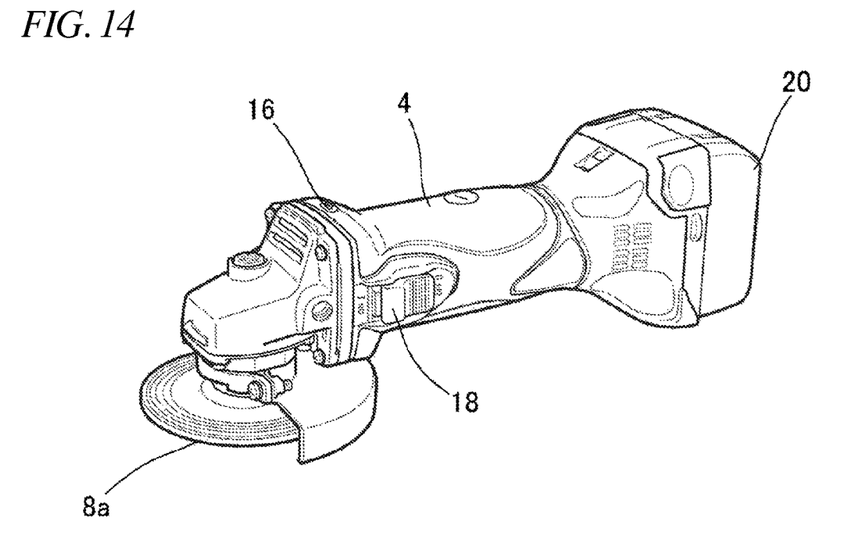
FIG. 14 is a perspective view showing a grinder according to another embodiment of the present invention.
Figure 15:
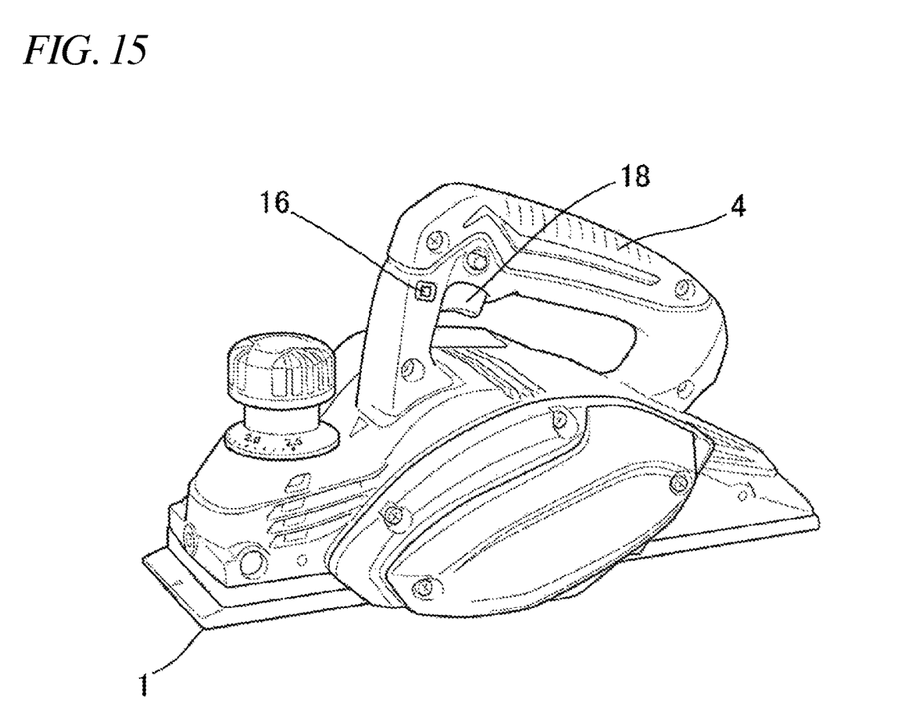
FIG. 15 is a perspective view showing an electric planer according to another embodiment of the present invention.

The electric power tool is not limited to the cordless circular saws as explained above, and may be any other electric power tool such as a grinder or an electric planer. FIG. 14 is a perspective view showing a grinder according to another embodiment. When a main trigger switch 18 is turned on, whereby a grind stone 8a is rotated by a motor, the grinder performs polishing or grinding. FIG. 15 is a perspective view showing an electric planer according to another embodiment. When a main trigger switch 18 is turned on, whereby a cutter block is rotated by a motor, the electric planer planes the surface of a workpiece. Not only in the case of the grinder shown in FIG. 14 but also in the case of the electric planer shown in FIG. 15, a functional block diagram is the same as FIG. 8, and a control flow chart is the same as FIG. 10, and in a case where a predetermined condition is satisfied, even while the main trigger switch 18 is on, it is possible to perform switching between operation modes by pushing the mode change switch 16. Also, since the mode change switch 16 is provided in the vicinity of the main trigger switch 18 of the handle portion 4, it is possible to operate both of the main trigger switch 18 and the mode change switch 16 with a hand holding the handle portion 4.

In the above-described embodiment, it is possible to select the normal mode in which the duty ratio is always 100%, and the economy mode in which constant-speed control is performed and the duty ratio is set to 100% in a high load state. According to this configuration, as described above, it is not necessarily to perform switching from the economy mode to the normal mode according to the load state. Therefore, there are effects that it is unnecessary to frequently perform mode switching during working, and operability is excellent. However, it may also be possible to select the normal mode in which the duty ratio is always 100%, and for example, an economy mode in which the duty ratio is always 80%. Also, the duty ratio in the normal mode may be, for example, 95% less than 100%. In the embodiment, as the driving source, the brushless motor is used. However, a motor with a brush may be used as the driving source.

What is claimed is:

1. An electric power tool comprising:
   a motor;
   a main switch configured to be manually operated by a user of the electric power tool for switching the motor between driving and stopping,
   a mode change switch configured to be manually operated by the user; and
   a control unit configured to drive the motor in one of a plurality of driving modes having different rotational speeds,
   wherein the control unit is configured to switch the operation mode in accordance with operation of the mode change switch by the user even during motor driving,
   wherein when a load on the motor is equal to or larger than a predetermined value, the control unit is configured to keep on driving the motor without performing the switching of the operation mode even if the mode change switch is operated during motor driving.

2. The electric power tool according to claim 1, wherein the operation modes include:
   a normal mode in which a duty ratio of a switching device for controlling supply of electric power to the motor is set to 100%; and
   an economy mode in which the duty ratio is controlled such that the rotation speed of the motor is maintained at a predetermined rotation speed.

3. The electric power tool according to claim 1,
   wherein the main switch and the mode change switch are disposed to be operable with a hand holding a handle portion.

4. The electric power tool according to claim 1, comprising:
   a battery pack configured to be removably attached for supplying electric power to the motor; and
   a control unit configured to control driving of the motor according to an operation state of the main switch and the mode change switch,
   wherein when the main switch is maintained in an OFF state for a predetermined time period, the control unit is turned off, and when the main switch is turned on, the control unit returns from the OFF state to an ON state.

5. The electric power tool according to claim 1,
   wherein a handle portion is extending in a first direction, and
   wherein the main switch and the mode change switch are provided on one side in the first direction with respect to a center of the handle portion.

6. The electric power tool according to claim 5, wherein the main switch is facing in a second direction perpendicular to the first direction, and the mode change switch is facing in a third direction perpendicular to both of the first direction and the second direction.

7. The electric power tool according to claim 5, wherein the main switch is operable in a second direction perpendicular to the first direction, and the mode change switch is operable in a third direction perpendicular to both of the first direction and the second direction.

8. The electric power tool according to claim 5, the electric power tool further comprising a display unit for displaying the mode, wherein the display unit is located on a side opposite to the center of the handle with respect to the mode change switch.

9. The electric power tool according to claim 1, wherein the control unit sequentially switches the operation modes every time when the mode change switch is operated.

10. The electric power tool according to claim 1, further comprising a tip tool,
    wherein a display unit configured to display a present operation mode or the mode change switch is disposed to face a side opposite to the tip tool.

11. The electric power tool according to claim 1,
    wherein the mode change switch is a push switch.

12. The electric power tool according to claim 1,
    wherein the mode change switch and the display unit are disposed on a same circuit board.

13. The electric power tool according to claim 1,
wherein the control unit is configured such that a rotation speed of the motor is changed smoothly or in a stepwise manner at the switching among the operation modes.

14. The electric power tool according to claim 1, the electric power tool further comprising:
a housing accommodating the motor, and
a handle portion including the main switch and is connected to the housing;
wherein the mode change switch is disposed at the housing and faces to the handle portion.

15. The electric power tool according to claim 1, the electric power tool further comprising a inverter circuit,
wherein the motor is a brushless motor,
wherein the control unit is configured to control the inverter unit for driving the brushless motor.

16. An electric power tool comprising:
a motor;
a main switch configured to perform switching between driving and stopping of the motor,
a plurality of operation modes with different rotation speeds at least in a predetermined load range;
a mode change switch configured to perform switching among the plurality of operation modes;
a control unit configured to switch the operation modes while the motor is driving;
and
a display unit configured to display a present operation mode,
wherein the control unit prohibits switching the plurality of operation modes for a predetermined time after the main switch is turned on.

17. The electric power tool according to claim 16, wherein the circuit board is provided on a lower side of a handle portion.

18. The electric power tool according to claim 16,
wherein the control unit performs a soft start control for gradually increasing a rotation speed of the motor after the main switch is turned on.

19. The electric power tool according to claim 16,
wherein the control unit is configured such that a rotation speed of the motor is changed smoothly or in a stepwise manner at the switching among the operation modes.

20. An electric power tool comprising:
a motor;
a main switch configured to be manually operated by a user of the electric power tool for switching the motor between driving and stopping,
a mode change switch configured to be manually operated by the user; and
a control unit configured to drive the motor in one of a plurality of driving modes having different rotational speeds,
wherein when in a no-load state which is a load on the motor is small, the control unit is configured to switch the operation mode in accordance with operation of the mode change switch by the user even during motor driving,
wherein when in a high-load state which is the load is large, the control unit is configured to keep on driving the motor without performing the switching of the operation mode even when the mode change switch is operated during motor driving.

\* \* \* \* \*